US010473121B2

(12) United States Patent
Zhao et al.

(10) Patent No.: US 10,473,121 B2
(45) Date of Patent: Nov. 12, 2019

(54) TURBOCHARGER WITH A WASTEGATE NOISE REDUCTION DEVICE

(71) Applicant: GM GLOBAL TECHNOLOGY OPERATIONS LLC, Detroit, MI (US)

(72) Inventors: Guangzhi A. Zhao, Troy, MI (US); Travis Sperow, Davisburg, MI (US); Carnell E. Williams, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/884,861

(22) Filed: Jan. 31, 2018

(65) Prior Publication Data
US 2019/0234428 A1    Aug. 1, 2019

(51) Int. Cl.
F04D 29/66 (2006.01)
F01N 1/04 (2006.01)
F02B 37/18 (2006.01)
F04D 29/42 (2006.01)

(52) U.S. Cl.
CPC ............ F04D 29/665 (2013.01); F01N 1/04 (2013.01); F02B 37/186 (2013.01); F04D 29/4213 (2013.01); F04D 29/664 (2013.01); F05D 2220/40 (2013.01)

(58) Field of Classification Search
CPC .... F04D 29/665; F04D 29/664; F04D 29/663; F02B 37/186; F02B 37/183; F02B 37/18; F01D 17/105; F01N 1/04; F05D 2220/40
USPC ......................................................... 415/119
See application file for complete search history.

(56) References Cited

U.S. PATENT DOCUMENTS

| 7,017,706 | B2 * | 3/2006 | Brown ................ F01D 25/30 181/222 |
| 7,942,625 | B2 | 5/2011 | Sirakov et al. |
| 2008/0289902 | A1 * | 11/2008 | Krus ................ B60R 13/0838 181/290 |
| 2010/0098532 | A1 | 4/2010 | Diemer et al. |
| 2011/0159797 | A1 * | 6/2011 | Beltman ............... F04D 29/665 454/338 |
| 2012/0201655 | A1 * | 8/2012 | Kusakabe ............. F01D 9/026 415/116 |
| 2017/0074291 | A1 | 3/2017 | Karim et al. |
| 2018/0010513 | A1 * | 1/2018 | Lim .................... F02B 37/186 |
| 2018/0223873 | A1 * | 8/2018 | Ono .................... F04D 25/024 |

FOREIGN PATENT DOCUMENTS

DE   102004040317 A1   2/2006
GB        2551361 A    12/2017

* cited by examiner

Primary Examiner — Nathaniel E Wiehe
Assistant Examiner — David Whittaker
(74) Attorney, Agent, or Firm — Cantor Colburn LLP

(57) ABSTRACT

The present disclosure provides a turbocharger which reduces noise generated from the wastegate. The turbocharger includes a turbocharger housing, a rotary assembly, and a wastegate door. The turbocharger housing defines a wastegate opening, a resonator proximate to the wastegate opening, a compressor inlet, a compressor outlet, a turbine inlet, and a turbine outlet. The rotary assembly includes a turbine and a compressor attached to one another by a shaft wherein the rotary assembly is disposed in the turbocharger housing. The wastegate door may be moveably affixed to the turbocharger housing.

13 Claims, 6 Drawing Sheets

TURBOCHARGER WITH A WASTEGATE NOISE REDUCTION DEVICE

TECHNICAL FIELD

The present disclosure relates to a turbocharger system wherein noise generated by the turbocharger wastegate is reduced.

BACKGROUND

Engine assemblies may incorporate the use of turbochargers to compress the air flowing into the engine to provide a greater amount of air to each cylinder. In order to compress the air flow into the engine, the turbocharger uses exhaust flow from the engine to spin a turbine, which in turn spins an air pump (or compressor). Many turbochargers are provided with a wastegate which acts as a valve to divert exhaust gases away from the turbine wheel in a turbocharged engine system in order to regulate the turbine speed. The wastegate is usually controlled by an actuator. The wastegate is normally closed and is held shut by the actuator. When a preset pressure limit is exceeded, the actuator progressively opens the wastegate allowing exhaust flow to bypass the turbine, thus regulating manifold boost pressure. A turbocharger wastegate actuator is selected or engineered for specified boost level and turbine inlet pressure.

In transient and steady state operation of compressors, there are known noise, vibration, and harshness (NVH) issues characterized by a whoosh noise, or simply whoosh. The turbocharger may therefore cause undesirable or unacceptable levels of NVH. In one particular region of the turbocharger, the wastegate traditionally experiences issues with noise resulting from air flowing out of the wastegate opening particularly when the wastegate door opens and closes.

Attempts have been made to mitigate noise from turbochargers. One attempt to mitigate noise is disclosed in US Patent publication 2010/0098532 to Diemer et al. This reference attempts to reduce turbocharger stall noise by providing a groove that straddles a leading edge of splitter blades of the compressor. The groove is located downstream from a leading edge of main blades to provide a path for fluid around a rotating stall. However, this groove is intended to address noise generated from the compressor wheel.

Other attempts to minimize turbocharger noise have provided various re-circulation passages wherein part of the flow is re-circulated from a downstream position to an upstream position via a passage separate from a main flow passage. An example of such an approach is disclosed in U.S. Pat. No. 7,942,625 to Sirakov et al. Sirakov provides a bleed passage downstream from a blade leading edge that enables a portion of fluid flowing through the compressor to re-circulate to an upstream location via an internal cavity and injection passage. However, similar to US Patent publication 2010/0098532, the aforementioned solution is directed to noise generated from the compressor wheel.

Accordingly, there is a need to reduce noise generated from the wastegate of a turbocharger.

SUMMARY

The present disclosure provides a turbocharger which reduces noise generated from the wastegate. The turbocharger includes a turbocharger housing, a rotary assembly, and a wastegate door. The turbocharger housing defines a wastegate opening, a resonator proximate to the wastegate opening, a compressor inlet, a compressor outlet, a turbine inlet, and a turbine outlet. The rotary assembly includes a turbine and a compressor attached to one another by a shaft wherein the rotary assembly is disposed in the turbocharger housing. The wastegate door may be moveably affixed to the turbocharger housing. It is further understood that the turbocharger may also include an engagement surface at the wastegate opening such that the engagement surface is configured to abut a peripheral interior surface of the wastegate door.

With respect to the resonator, the resonator may further include a resonator cavity and a resonator passageway which are each defined in the turbocharger housing. The resonator cavity may be in fluid communication with the wastegate opening when the wastegate door is in an open position. The resonator may further include a sound absorbing layer or sound absorbing structure disposed within the resonator cavity. The sound absorbing layer/structure may, but not necessarily, be affixed to an interior surface of the resonator cavity. The sound absorbing layer/structure may take various forms, such as but not limited to, a porous wire mesh, a sprayable foam layer, or a coating.

In yet another embodiment of the present disclosure, a turbocharger for a vehicle may include a turbocharger housing, a rotary assembly, a resonator, and a wastegate door. The turbocharger housing may define a compressor inlet, a compressor outlet, a turbine inlet, a turbine outlet, a wastegate opening, and a resonator mount proximate to the wastegate opening. The rotary assembly may include a turbine and a compressor attached to one another by a shaft wherein the rotary assembly may be disposed in the turbocharger housing. The resonator may be affixed to a resonator mount wherein the resonator mount and the resonator collectively define a resonator passageway. The wastegate door may be moveably affixed to the wastegate opening.

The turbocharger of the second embodiment may further include an engagement surface at the wastegate opening wherein the engagement surface is configured to abut a peripheral interior surface of the wastegate door. It is understood the resonator cavity may be in fluid communication with the wastegate opening when the wastegate door is in an open position. The resonator may further include a sound absorbing layer or sound absorbing structure disposed within the resonator cavity. The sound absorbing layer/structure may, but not necessarily, be affixed to an interior surface of the resonator cavity. The sound absorbing layer/structure may take various forms, such as but not limited to, a porous wire mesh, a sprayable foam layer, or a coating.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
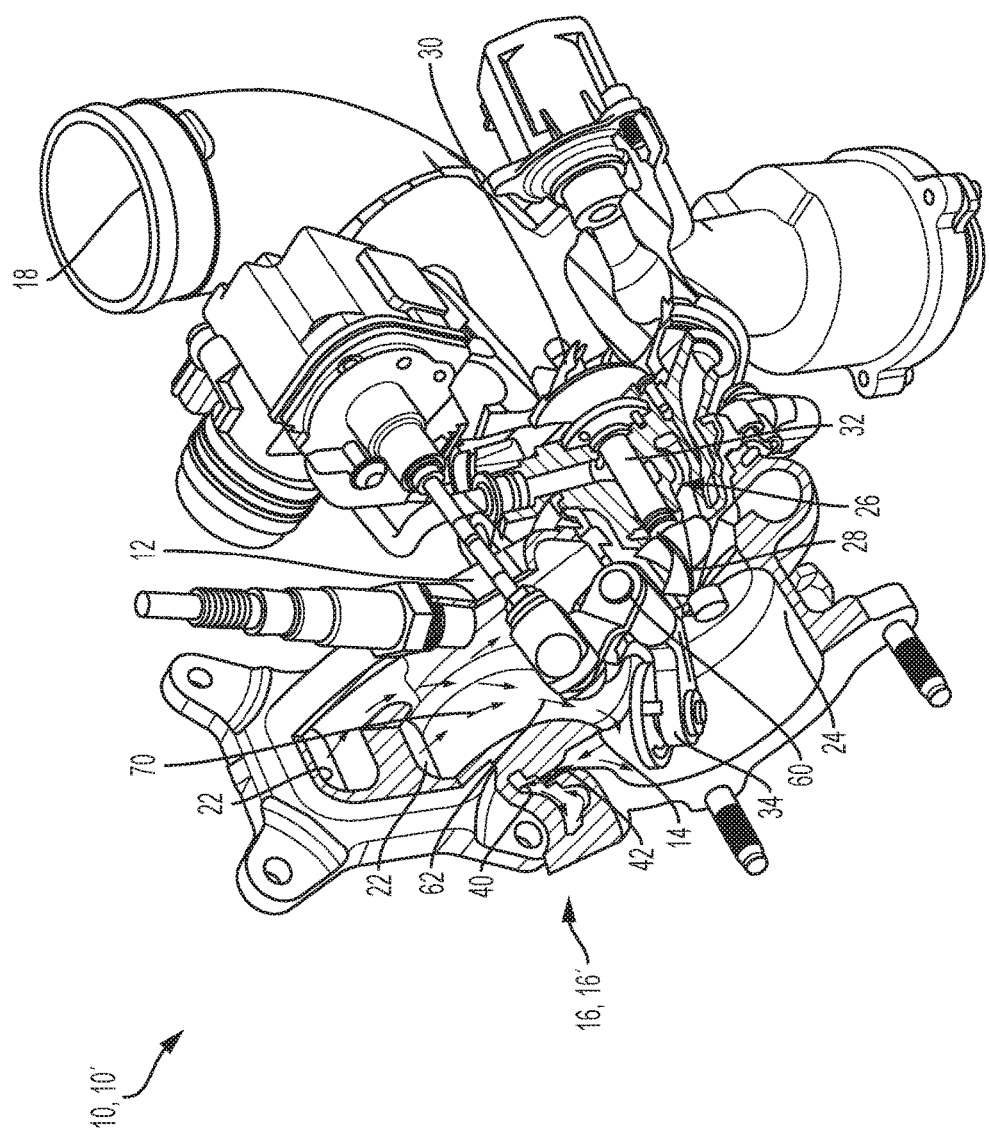
FIG. 1A is an example cut-away view of a turbocharger in accordance with the various embodiments of the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

With reference to FIG. 1A, a first embodiment turbocharger 10 is shown which reduces noise 62 generated from the wastegate. The turbocharger 10 includes a turbocharger housing 12, a rotary assembly 26, and a wastegate door 34. The turbocharger housing 12 defines a wastegate opening 14, a resonator 16 proximate to the wastegate opening 14, a compressor inlet 18, a compressor outlet 20 (FIG. 1B), a turbine inlet 22, and a turbine outlet. The rotary assembly 26 includes a turbine and a compressor attached to one another by a shaft 32 wherein the rotary assembly 26 is disposed in the turbocharger housing 12. The wastegate door 34 may be moveably affixed to the turbocharger housing 12 via a pivot as shown in FIG. 1A. It is further understood that the turbocharger 10 may also include an engagement surface 36 (FIG. 2A) at the wastegate opening 14 such that the engagement surface 36 is configured to abut a peripheral interior surface 38 (FIG. 2A) of the wastegate door 34.

It is understood that when the wastegate door 34 is in an open position 44, which includes but is not limited to, the wastegate door 34 being open about 2.5 degrees. A noise condition 62, such as a whoosh noise, may occur due to an exhaust gas flow 70 (FIGS. 1A and 2B) exiting through the wastegate opening. However, the resonator 16 of the present disclosure is configured to cancel out the noise condition 62, such as sound waves associated with the noise condition 62, generated at the wastegate opening 14 when the wastegate door 34 is in the aforementioned open position 44. An example path of the sound waves associated with the noise condition 62 is shown in FIG. 1A. As the sound waves of the noise condition 62 enter the resonator 16 chamber, the sound waves of the noise condition 62 are cancelled out thereby attenuating any noise generated at the wastegate opening 14.

Figure 1B:
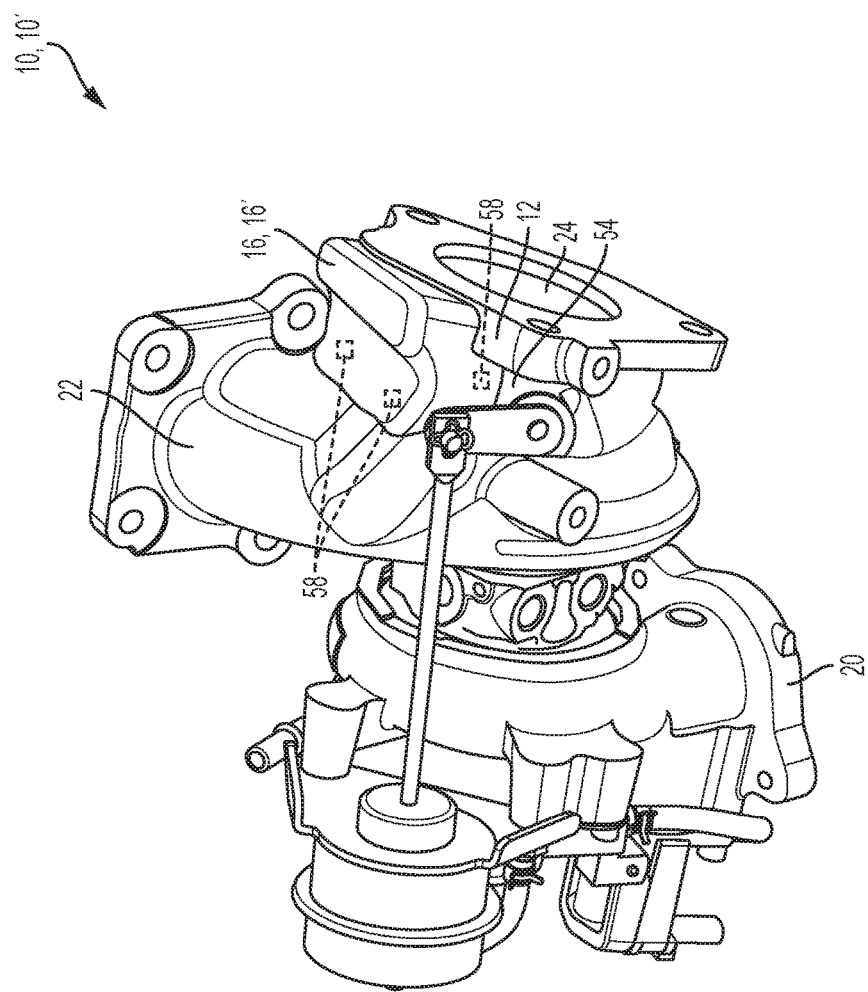
FIG. 1B is an isometric view of a turbocharger in accordance with various embodiments of the present disclosure.

With reference now to FIG. 1B, the resonator 16 is shown as part of the turbocharger 10 wherein the resonator 16 (shown in FIG. 1A) may be integral to the turbocharger housing 12 such that the resonator 16 and the resonator cavity 40 are defined by the turbocharger housing 12. The dashed lines shown in FIG. 1B shall be discussed later in the present disclosure.

Figure 2A:
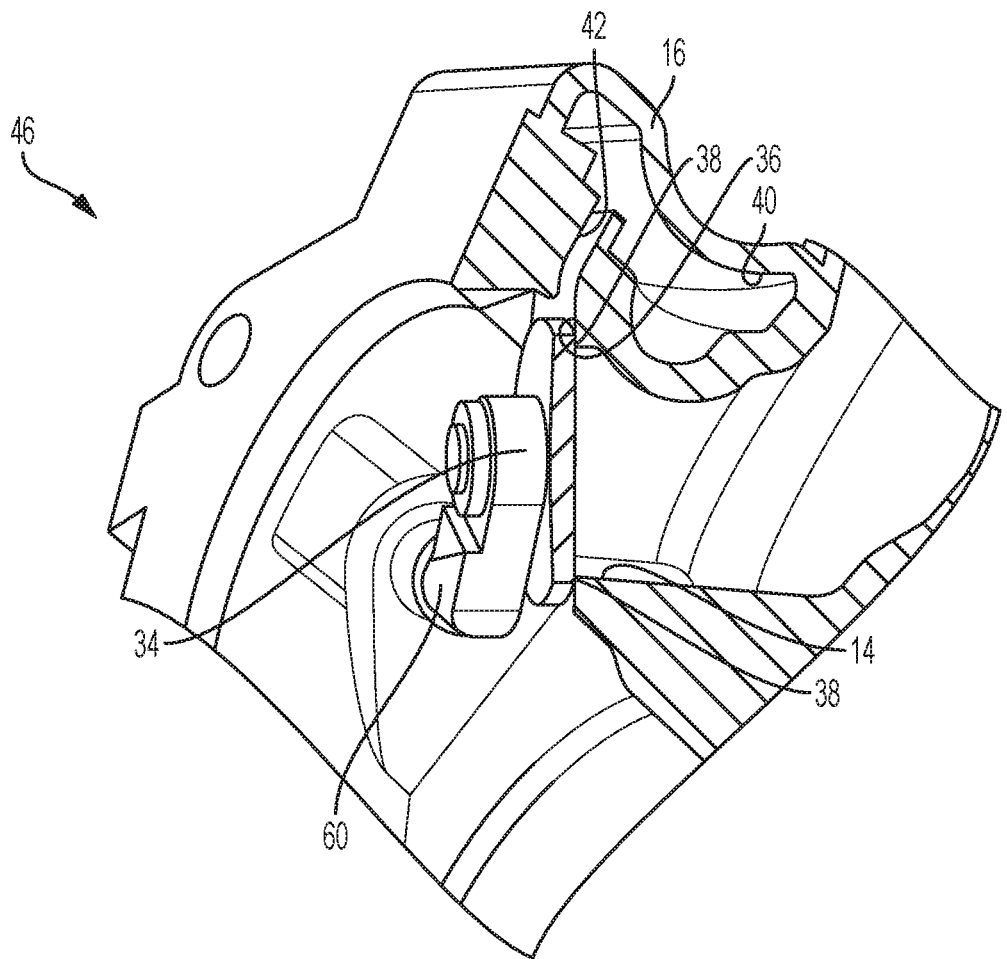
FIG. 2A is an enlarged cross-sectional view of the wastegate and resonator of the present disclosure wherein the wastegate door is in the closed position.
Figure 3A:
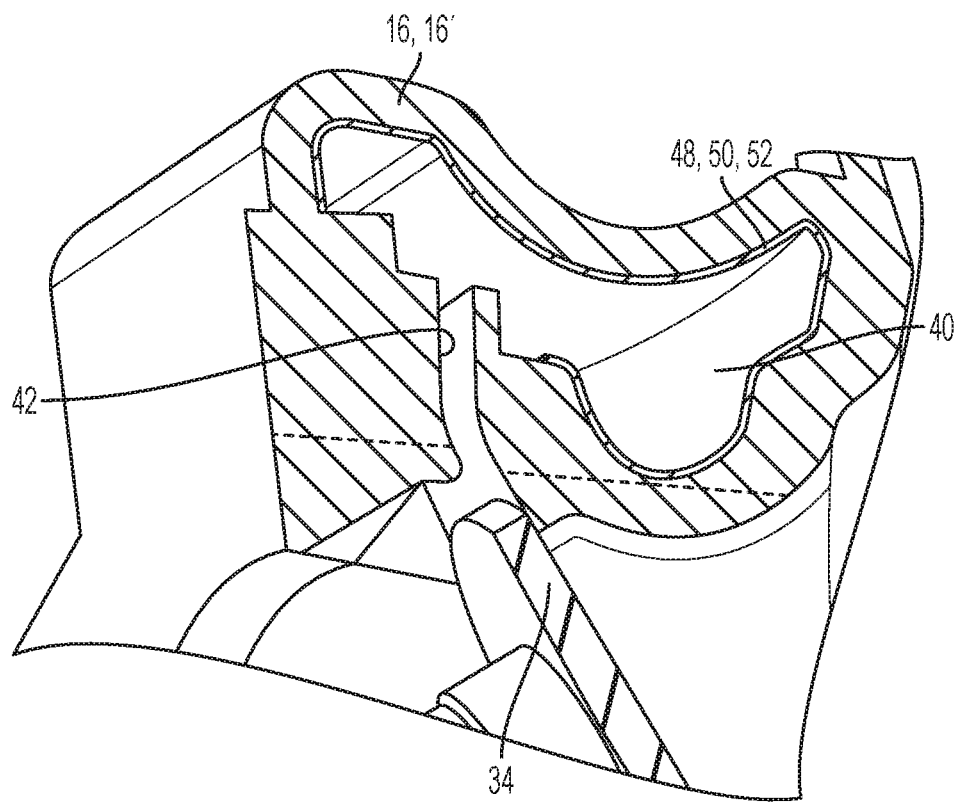
FIG. 3A is an enlarged cross-sectional view of a wastegate and resonator of the present disclosure wherein a sound absorbing layer is affixed to the interior surface of the resonator chamber.
Figure 3B:
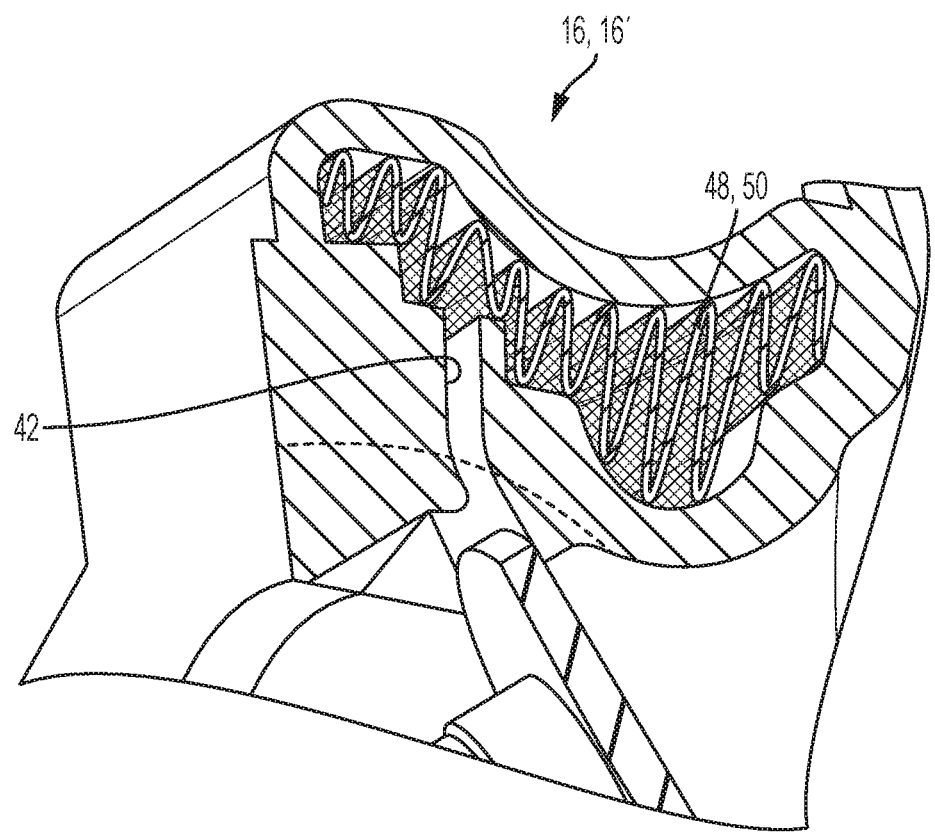
FIG. 3B is an enlarged cross-sectional view of a wastegate and resonator of the present disclosure wherein a sound absorbing layer is disposed within the resonator chamber.

With respect to the resonator 16, the resonator 16 may further include a resonator cavity 40 and a resonator passageway 42 which are each defined in the turbocharger housing 12 as shown in FIGS. 1A and 2A. The resonator cavity 40 may have a volume which may be as small as 14,000 mm3 to about 57,000 mm3. A preferable, but not required, resonator cavity volume may be 28,000 mm3. The resonator cavity 40 may be in fluid communication with the wastegate opening 14 when the wastegate door 34 is in an open position 44 as shown in FIG. 1A. The resonator 16 may further include a sound absorbing layer 48 or sound absorbing structure disposed within the resonator cavity 40 as shown in FIGS. 3A and 3B. The sound absorbing layer 48 may, but not necessarily, be affixed to an interior surface of the resonator cavity 40. The sound absorbing layer 48 may take various forms, such as but not limited to, a porous wire mesh, a sprayable foam 52 layer, or a coating. The porous wire mesh may be affixed to the interior surface of the resonator cavity 40 via cast-in hook and loop fasteners (similar to a Velcro structure). Alternatively, the sound absorbing layer 48 (or mesh layer 50) may simply be packed into the resonator cavity 40 as shown in FIG. 3B and may optionally include a strainer 51 which prevents the sound absorbing layer 48 from blocking the resonator passageway 42 and becoming dislodged. In the event a sprayable foam 52 layer is used as the sound absorbing layer 48, the sprayable foam 52 may be configured to adhere to the interior surface of the resonator cavity 40.

Figure 2B:
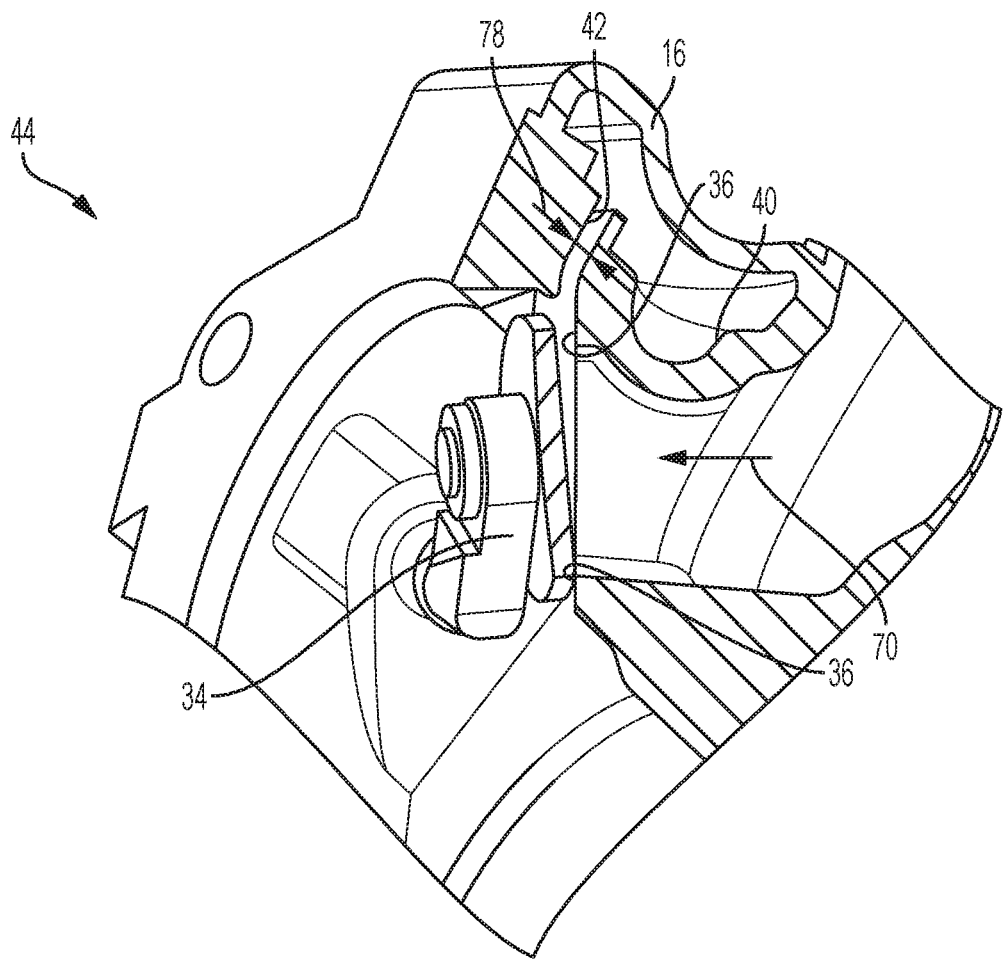
FIG. 2B is an enlarged cross-sectional view of a wastegate and resonator of the present disclosure wherein the wastegate door is in a partially open position.

In yet another embodiment of the present disclosure, a turbocharger 10' for a vehicle may include a turbocharger housing 12, a rotary assembly 26, a resonator 16' may be affixed to the turbocharger housing 12, and a wastegate door 34 as shown in FIG. 1A. The turbocharger housing 12 may define a compressor inlet 18, a compressor outlet 20 (FIG. 1B), a turbine inlet 22, a turbine outlet, a wastegate opening 14, and a resonator mount 54 proximate to the wastegate opening 14. The rotary assembly 26 may include a turbine wheel 28 and a compressor wheel 30 attached to one another by a shaft 32 wherein the rotary assembly 26 may be disposed in the turbocharger housing 12. With reference to FIG. 1B, the resonator 16' may be affixed to a resonator mount 54 defined in the turbocharger housing 12 wherein the resonator mount 54 and the resonator 16' collectively define a resonator passageway 42 as shown in FIG. 2A. With respect to all embodiments of the present disclosure, it is understood that the resonator passageway 42 may have a diameter or width 78 which may but not necessarily fall within the range of about 5 mm to about 9 mm. (FIG. 2B)

Similar to the first embodiment, the resonator 16' may include a resonator cavity 40 having a volume which may be as small as 14,000 mm3 to about 57,000 mm3. A preferable, but not required, resonator cavity volume may be 28,000 mm3. A plurality of fasteners 58 may, but not necessarily, be used to affix the resonator 16' to the resonator mount 54 or turbocharger housing 12. The dashed lines in FIG. 1B and FIG. 2A illustrate how the resonator 16 may optionally be a separate component to the turbocharger housing 12. The wastegate door 34 may be moveably affixed to a portion of the turbocharger housing 12 located adjacent the wastegate opening 14 such as, but not necessarily, by a pivot joint 60 as shown in FIG. 1A.

With respect to the resonator 16, the resonator 16 may further include a resonator cavity 40 and a resonator passageway 42 which are each defined in the turbocharger housing 12 as shown in FIGS. 1A and 2A. The resonator cavity 40 may be in fluid communication with the wastegate opening 14 when the wastegate door 34 is in an open position 44 as shown in FIG. 2B. The resonator 16 may further include a sound absorbing layer 48 or sound absorbing structure disposed within the resonator cavity 40 as shown in FIGS. 3A and 3B. The sound absorbing layer 48 may, but not necessarily, be affixed to an interior surface of the resonator cavity 40. The sound absorbing layer 48 may take various forms, such as but not limited to, a porous wire mesh, a sprayable foam 52 layer, or a coating. The porous wire mesh may be affixed to the interior surface of the resonator cavity 40 via cast-in hook and loop fasteners. Alternatively, the sound absorbing layer 48 (or mesh layer 50) may simply be packed into the resonator cavity 40 as shown in FIG. 3B and may optionally include a strainer which prevents the sound absorbing layer 48 from blocking the resonator passageway 42. In the event the sprayable foam 52 layer is used as the sound absorbing layer 48, the sprayable foam 52 may be configured to adhere to the interior surface of the resonator cavity 40. An example path of the sound waves of the noise condition 62 is shown in FIG. 1A. As previously noted, a noise, such as the whoosh noise described above, may be generated at the wastegate opening due to an exhaust gas flow 70 (FIGS. 1A and 2B) exiting through the wastegate opening 14. As the sound waves of the noise condition 62 enter the resonator cavity 40, the sound waves of the noise condition 62 are cancelled out thereby attenuating any noise generated at the wastegate opening 14 as previously described.

While example embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbocharger comprising:
    a turbocharger housing defining a wastegate opening, a resonator located proximate to the wastegate opening and including a resonator cavity and a resonator passageway, a compressor inlet, a compressor outlet, a turbine inlet, and a turbine outlet;
    a rotary assembly including a turbine and a compressor attached to one another by a shaft, the rotary assembly being disposed in the turbocharger housing; and
    a wastegate door moveably affixed to the turbocharger housing and located downstream of the resonator passageway,
    wherein the resonator is configured to attenuate noise generated at the wastegate opening, the resonator being arranged with the wastegate opening such that the resonator cavity is in direct fluid communication with a wastegate exhaust flow via the resonator passageway when the wastegate door is in an open position.

2. The turbocharger as defined in claim 1 further comprising an engagement surface at the wastegate opening, the engagement surface configured to abut a peripheral interior surface of the wastegate door.

3. The turbocharger as defined in claim 2 further comprising a sound absorbing layer disposed within the resonator cavity.

4. The turbocharger as defined in claim 3, wherein the sound absorbing material is affixed to an interior surface of the resonator cavity.

5. The turbocharger as defined in claim 3, wherein the sound absorbing material is a porous wire mesh.

6. The turbocharger as defined in claim 3, wherein the sound absorbing material is a sprayable foam.

7. A turbocharger for a vehicle comprising:
    a turbocharger housing defining a compressor inlet, a compressor outlet, a turbine inlet, a turbine outlet, a wastegate opening, and a resonator mount proximate to the wastegate opening;

a rotary assembly including a turbine and a compressor attached to one another by a shaft, the rotary assembly being disposed in the turbocharger housing;

a resonator affixed to the resonator mount; and a wastegate door moveably affixed to a portion of the turbocharger housing located adjacent the wastegate opening, wherein the resonator is configured to attenuate noise generated at the wastegate opening, the resonator including a resonator cavity and a resonator passageway defined in the turbocharger housing, the resonator passageway being located upstream of the wastegate door and the resonator mount and the wastegate opening being arranged with one another such that the resonator cavity is in direct fluid communication with a wastegate exhaust flow via the resonator passageway when the wastegate door is in an open position.

8. The turbocharger as defined in claim 7, wherein the resonator is affixed to the resonator mount via a mechanical fastener.

9. The turbocharger as defined in claim 7 further comprising an engagement surface at the wastegate opening, the engagement surface configured to abut a peripheral interior surface of the wastegate door.

10. The turbocharger as defined in claim 8 further comprising a sound absorbing layer disposed within the resonator cavity.

11. The turbocharger as defined in claim 10, wherein the sound absorbing material is affixed to an interior surface of the resonator cavity.

12. The turbocharger as defined in claim 10 wherein the sound absorbing material is a porous wire mesh.

13. The turbocharger as defined in claim 10, wherein the sound absorbing layer is a sprayable foam.

* * * * *